March 16, 1965  B. P. L. AMIET  3,173,811

ELECTRIC BATTERY AND ACTIVATION DEVICE THEREFOR

Filed July 28, 1960

INVENTOR:
BERNARD PAUL LOUIS AMIET
BY
AGENT

United States Patent Office 3,173,811
Patented Mar. 16, 1965

3,173,811
ELECTRIC BATTERY AND ACTIVATION
DEVICE THEREFOR
Bernard Paul Louis Amiet, Ville d'Avray, France, assignor to Yardney International Corp., New York, N.Y., a corporation of New York
Filed July 28, 1960, Ser. No. 45,915
Claims priority, application France, Aug. 5, 1959, 802,143, Patent 1,248,448
2 Claims. (Cl. 136—90)

This invention relates to electric batteries. More particularly, the invention relates to batteries of the deferred-action type that are charged in the dry state and subsequently activated by the introduction of liquid electrolyte into the casing containing the electrode assembly.

Deferred-action type batteries are useful under conditions requiring prolonged storage in a charged state since the absence of electrolyte during storage will effectively prevent any premature loss of charge and will also protect the inter-electrode separators from chemical attack and consequent early deterioration. Although such batteries can be used without preliminary on-the-spot charging, a certain delay is always necessary to allow for the activation of the battery, i.e. the permeation of the electrode assembly by the electrolyte. Furthermore, the activation mechanism must be reliable as well as rapid in operation in order to assume fast even metering of the electrolyte into the casing containing the electrode assembly and, consequently, quick activation.

It is, therefore, a primary object of the invention to provide a dry-charged battery having improved means for activating the same.

It is another object of the invention to provide a dry-charged battery having a mechanism for its activation which is simple in construction but reliable and rapid in operation.

It is still another object of the invention to provide means for storing an electrolyte adjacent an electrode assembly in a self-contained leak-proof unit in which the electrolyte is securely prevented from making contact with the electrode assembly until it is given access thereto by the operation of an activating mechanism.

Other objects and advantages of the invention will be apparent from the following description and reference to the accompanying drawing in which.

Figure 1:
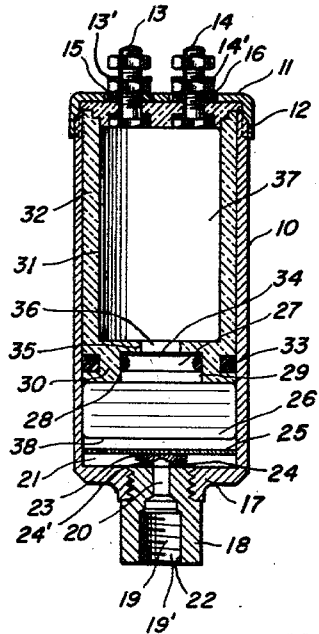
FIG. 1 is a sectional elevation of a self-contained battery unit according to the invention in non-activated condition.
Figure 2:
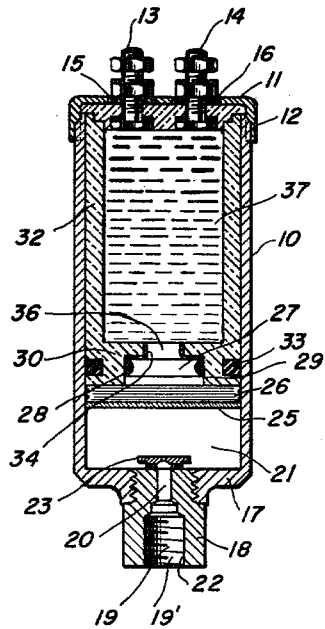
FIG. 2 is a sectional elevation of the same unit in activated condition.
Figure 4:
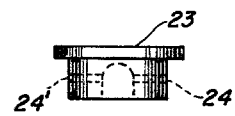
FIG. 4 is a section view of a cap covering the gas-inlet channel of the devices shown in the preceding Figures.

As shown in FIGS. 1, 2, and 4, the device comprises a housing body 10, generally of metallic construction although other types of materials such as tough plastic can be employed. The body 10 has a cover 11 engaging its upper end at the edge 12. The cover is traversed by threaded terminal bolts 13 and 14 passing through openings on the surface thereof. Insulating washers 15 and 16 are interposed between the surface of the cover 11 and nuts 13', 14' on the terminal bolts 13, 14. Body 10 is extended at the lower end as shown at 17. The extended portion 17 forms an opening adapted to receive a threaded nipple 18. The nipple 18 has a central inlet channel 19 extending throughout its length. The channel is of greater diameter at the lower end, as shown at 19', becoming smaller in diameter at its upper end 20 which opens into a compression chamber 21 constituting an electrolyte compartment in the lower part of body 10. A screw tap 22 enables the connection of a compressed-gas tube, not shown, to nipple 18.

The narrow upper end 20 of channel 19 is covered with a stationary fluid-distributing cap 23 having lateral discharge openings 24 and 24' as shown in FIG. 4. These lateral openings or channels permit entrance of gas at several points, thereby resulting in substantially uniform pressure on a freely movable disk 25 which rests on the crown of cap 23. Disk 25 is adapted to fit snugly within the lower confines of the wall of body 10 which forms chamber 21. This washer can be made from cardboard, plastic or some other suitable material. Positioned within chamber 21 above the flat disk 25 is an electrolyte container 26, made of flexible material such as polyethylene, whose lateral wall is in contact with the inner wall of body 10. The neck of container 26 is introduced into and held tightly by sealing ring 28 in cavity 29 which is formed by a depending boss 30 of a casing 32 defining an electrode compartment 31.

The outer wall of a battery casing 32 is in contact with the upper inner wall of body 10. A sealing ring 33 is placed between boss 30 and body 10 to insure a tight joint. The orifice 27 of the flexible electrolyte container 26 is covered with a frangible seal in the form of a membrane 34 adapted to breach easily under pressure around its peripheral edges where it is in contact with a partition 35 which overlies the boss 30 and has a central orifice 36 which opens into the electrode compartment 31. The shape of the device is preferably cylindrical as shown in the drawing. However, the invention is readily adaptable to other shapes, such as rectangular prisms, for example. Compartment 31 contains electrodes 37 of positive and negative polarities which are connetced to poles 13 and 14, respectively. The arrangement of the electrodes within compartment 31 does not constitute part of the present invention and any suitable arrangement may be employed. Typical electrode arrangements shown in the prior art that can be used are illustrated in the U.S. Patents Nos. 2,529,511 and 2,810,776.

In its non-activated state, the device according to the invention is as illustrated in FIG. 1. The electrolyte is held in container 26 sealed by frangible membrane 34, preferably of flexible, resilient material such as polyethylene or the like in order to avoid any risk of breakage in response to acceleration, shock waves or other severe conditions to which the device may be subjected. The device as constructed can remain in such condition for practically an indefinite period of time. For the purpose of activation, compressed gas is allowed to enter channel 19 from which it passes through holes 24 and 24' in cap 23, thereby forcing the disk 25 to bear in piston-like fashion upon the entire underside 38 of container 26. As a result of the increase of pressure inside the container 26, membrane 34 is broken and the electrolyte is forced into the interior of compartment 31 which contains the electrodes 37, thereby activating the battery. This condition is shown in FIG. 2.

Figure 3:
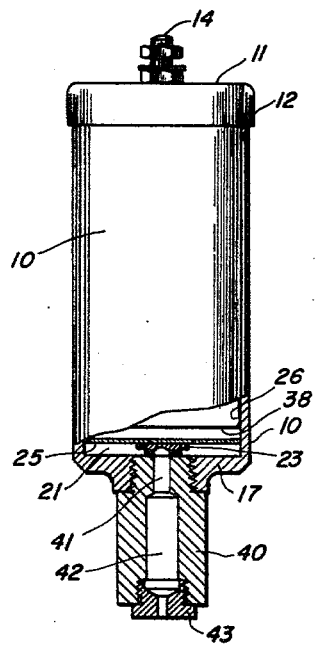
FIG. 3 is a partial sectional elevation showing a variation of the activation mechanism.

In the embodiment of the invention shown in FIG. 3, the activating device is slightly modified. The lower end of body 10 is equipped with a nipple 40 having a channel 41 in its upper end and an enlarged chamber 42 at its lower end; chamber 42 contains an explosive powder and is closed with a fuse plug 43. In operation, the powder contained in chamber 42 is ignited by the passage of an electric current through fuse plug 43. Combustion of the powder suddenly increases the pressure in chamber 21 and the battery is activated as hereinbefore described.

The battery according to the invention may also be activated by both an explosive powder charge which gives off gases and a source of compressed gas, such as a squib cartridge. When such an arrangement is employed, the increase in temperature caused by the gases from the exploding powder prevents excessive cooling of the expanding gases issuing from the compressed-gas source, thereby making possible the utilization of a gas having a low point of liquefaction, freezing and/or sublimation, such as carbon dioxide gas.

It will be readily apparent to those skilled in the art that the electrode compartment mentioned hereinabove can contain different types of electrodes. For example, one particularly good system is a silver-zinc couple in which the electrolyte employed is potassium hydroxide. Furthermore, in a cell containing silver and zinc electrodes or any other type of electrodes, the latter may be spaced apart by separating membranes which can be made of nylon, cellulosic material, paper or other material and usually are placed between the electrodes to prevent short circuits within the cell itself.

A deferred-action battery in accordance with the present invention presents the advantages of rapid activation, yet the activating mechanism disclosed and claimed herein is simple in construction and has a relatively small number of moving parts, thereby minimizing the risks of malfunctioning due to accidental breakdown of the components. In addition, the battery of this invention may be subjected to severe vibration and handling without great risks of improper operation.

Numerous modifications of the disclosed embodiments of this invention can be made without departing from the spirit and scope thereof and it is to be understood that the invention is not to be limited except as defined in the appended claims.

I claim:

1. In an electric battery of the deferred-action type, in combination, a housing, partition means in said housing sub-dividing its interior into an electrode compartment and an electrolyte compartment, said partition means being provided with an opening, pressure-rupturable seal means blocking said opening and adapted to rupture in response to liquid pressure, said electrolyte compartment being provided with an inlet port which faces said opening and is connectable to a source of fluid under pressure whereby said fluid can be introduced into said electrolyte compartment, a fluid-distributing cap overlying said port in said electrolyte compartment, said cap being provided with a substantially flat face opposite said opening and with a plurality of lateral discharge orifices communicating with said port, a collapsible container filled with electrolyte disposed in said electrolyte compartment between said partition means and said cap, said container being open toward said seal means, and a flat piston substantially wider than said cap and said opening movbly disposed in said electrolyte compartment between said cap and said container for broad-surface contact with the latter and displacement toward said opening under pressure of said fluid whereby said electrolyte is squeezed, thereby rupturing said seal means and flowing into said electrode compartment, said piston being adapted to rest against said flat face of said cap prior to the introduction of fluid from said source into said electrolyte compartment.

2. In an electric battery of the deferred-action type, in combination, a housing, partition means in said housing subdividing its interior into an electrode compartment and an electrolyte compartment, said partition means being provided with an opening, a frangible membrane blocking said opening, said electrolyte compartment being provided with an inlet port which faces said opening and is connectable to a source of fluid under pressure whereby said fluid can be introduced into said electrolyte compartment, a fluid-distributing cap overlying said port in said electrolyte compartment, said cap being provided with a substantially flat face opposite said opening and with a plurality of lateral discharge orifices communicating with said port, a collapsible container filled with electrolyte disposed in said electrolyte compartment between said partition means and said cap, said container being open toward said membrane, and a flat piston substantially wider than said cap and said membrane movably disposed in said electrolyte compartment between said cap and said container for broad-surface contact with the latter and displacement toward said opening under pressure of said fluid whereby said electrolyte is squeezed, thereby rupturing said membrane and flowing into said electrolyte compartment, said piston being adapted to rest against said flat face of said cap prior to the introduction of fluid from said source into said electrolyte compartment.

References Cited by the Examiner

UNITED STATES PATENTS

| | | | |
|---|---|---|---|
| 1,796,200 | 3/31 | Grieshaber | 137—70 |
| 2,106,577 | 1/38 | Sherbondy | 222—391 |
| 2,195,213 | 3/40 | Heigis | 137—70 |
| 2,529,511 | 11/50 | Murphy | 136—112 |
| 2,674,946 | 4/54 | Hjelm | 102—70.2 |
| 2,710,014 | 6/55 | Hayes | 137—70 |
| 2,787,650 | 4/57 | Blaric | 136—90 |
| 2,862,038 | 11/58 | Blaru | 136—90 |
| 2,923,756 | 2/60 | Hermitte | 136—90 |
| 2,937,220 | 5/60 | Bouman | 136—90 |
| 2,963,533 | 12/60 | Gold et al. | 136—90 |
| 3,005,863 | 10/61 | Floyd et al. | 136—90 |

FOREIGN PATENTS 1,094,210  12/54  France.

JOHN H. MACK, *Primary Examiner.*

JOSEPH REBOLD, MURRAY TILLMAN, *Examiners.*